March 6, 1956 P. P. ZINI ET AL 2,737,047
TEST DEVICE FOR TIRE VALVE
Filed June 17, 1953

INVENTORS,
PEDRO PRIMO ZINI
DOMINGO PEDRO BOTTINI
BY *Ivan P. Tashof*,
ATTORNEY

United States Patent Office 2,737,047
Patented Mar. 6, 1956

2,737,047

TEST DEVICE FOR TIRE VALVE

Pedro Primo Zini and Domingo Pedro Bottini,
Pergamino, Argentina

Application June 17, 1953, Serial No. 362,208

5 Claims. (Cl. 73—48)

The present invention refers to improvements in devices for testing the operation of valves applied to pneumatic inner tubes in general. Its main object is to provide an improved device which, due to its excellent constructive and functional features has evident advantages as compared with other similar devices and apparatus that, for the same purpose, have been proposed and used to date.

Testing devices of the kind mentioned are already well known. They usually consist, along general lines, of a receptacle partially filled with water or some other liquid, a conduit for air discharge communicating with the free interior portion of the liquid contained in said receptacle, with the outside and with an inlet conduit joining the adjusting inlet of the tire valve with the inside of the liquid mass contained by the receptacle, in such a manner that any air escaping from the tire must necessarily pass through the liquid mass in the form of a continuous succession of bubbles which are quite visible through the transparent walls of the receptacle. Defective functioning of the valve is thus immediately revealed.

In spite of the fact that devices of the kind described have already been subjected to some improvements, they are nevertheless still constructively and functionally deficient. All such deficiences, however, are eliminated by means of the improved device of this invention, which is clearly advantageous as compared with other known devices, not only as regards its constructive features but also in operation.

The invention likewise envisages other accessory objects that will be made clear during the course of the present description.

In order that the present invention may be more clearly understood and readily put into practice, the same will now be fully described with particular reference to a preferred embodiment illustrated as an example in attached drawings.

In the drawings.

Like numerals represent like or similar parts throughout the several figures of the drawing.

Figure 4:
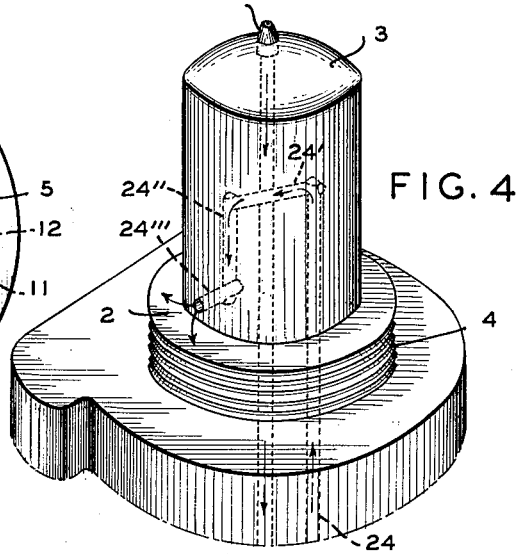
Figure 4 is a perspective view of the device, from which the outer covering has been removed in order to show more clearly the arrangement of the air inlet and outlet passages.

The testing device object of the present invention consists in the manner illustrated of a base 1. This base, as is shown in detail in Figure 4, is substantially cylindrical in shape and its upper face is provided with a projection 2 which, in turn, has a cylindrical appendix 3 of smaller diameter than members 1 and 2.

From the figures it can be seen, furthermore, that extension 2 is threaded (4) for receiving a transparent cap 5 constituting a receptacle 6 which is partially filled with a certain quantity of water or other liquid 7, the level of which is kept below the free end of appendix 3, as shown in detail in Figure 1. In order to prevent any possible loss of liquid a gasket 8 is arranged between the free edge of cap 5 and the upper base of body 1, a tight seal being thus assured.

Base 1 is limited at one of its sides by a flat face 9 from the centre of which a conduit or chamber 10 is directed radially towards the interior of the base, to continue axially in a further cylindrical conduit 11 of a more reduced diameter terminating in a flat end 12.

Conduit 11, at its inlet, is provided with a screw thread 13 receiving a bushing 14 forming integral part, at one of its ends, of a metal disc 15 both face of which are covered by rubber, leather or similar discs 16 and 17.

Figures 5, 6:
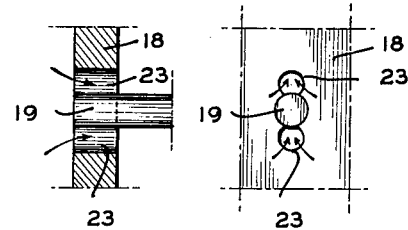
Figure 5 is a section on a larger scale of the passages leading to the interior of the device and, finally.
Figure 6 is a front view of the arrangement according to Figure 5.

The inside of conduit or chamber 10 houses a metal plunger-like disc 18 forming integral part of a rod 19 passing through central conduit 20 of bushing 14. Said disc 18 has applied to its outer face an additional disc 21. This latter disc, of leather, rubber or similar resilient material, is provided with a central orifice 22. Disc 18, where it joins rod 19, is flanked by narrow perforations 23, as shown in detail in Figures 5 and 6.

From Figures 1 through 4 it can be seen, furthermore, that another reduced-diameter conduit 24 branches off from conduit 11 and passes longitudinally through appendix 3, up to a certain height thereof, where after the respective elbow turns it forms channels 24', 24" and 24''', terminating radially close to the base of said appendix and in the liquid 7.

The upper end of appendix 3, in turn, is equipped with a small metal nozzle 25. This nozzle projects slightly above the top of the appendix, being the termination of a narrow longitudinal conduit 26 which branches off at right angles in a further conduit 26' terminating at the flat face of base 1.

Figure 1:
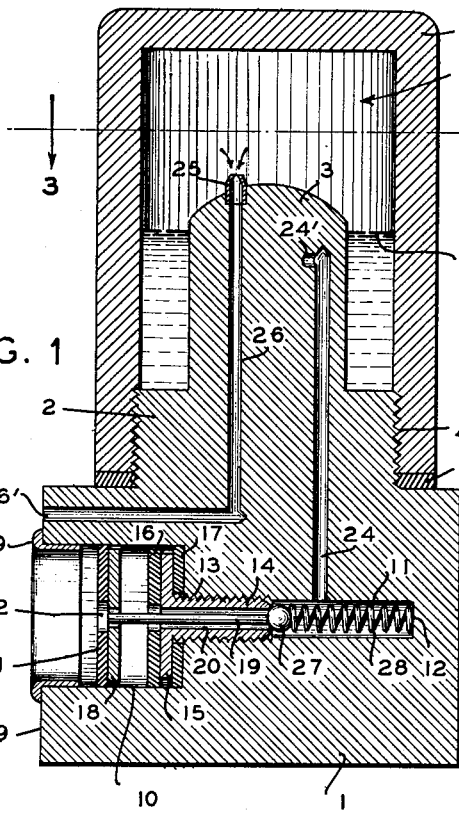
Figure 1 is a section taken diametrically through the device according to the invention, in its inactive position.
Figure 2:
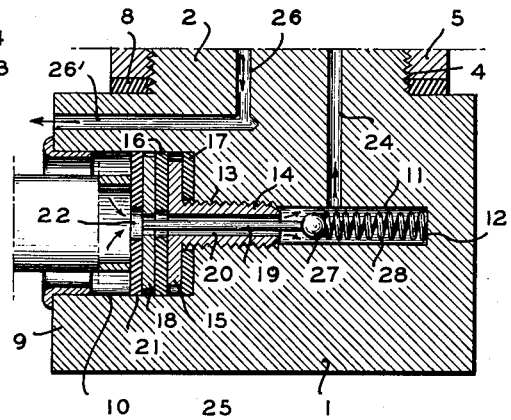
Figure 2 is a similar section of the same device, in operative position.
Figure 3:
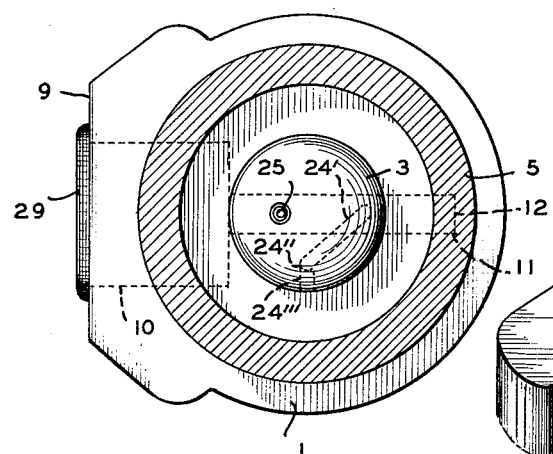
Figure 3 is a cross-section through the same arrangement, taken along the line 3—3 of Figure 1.

From Figures 1 through 3 it can be seen, finally, that a round ball 27 is placed within conduit 11. This ball acts as a check valve seating against bushing 14 in conduit 20 and normally kept in closing position by means of a spring 28 supported by the flat end 12 of said conduit. The outlet of conduit 10 is provided with a bushing 29 preventing the release of disc 18 and its rod 19.

Normally, all the parts of the device as described, subjected to pressure exerted by spring 28, are in the inoperative position illustrated by Figure 1. Valve 27, therefore, closes the outlet of conduit 20 and bushing 14, thus preventing liquid 7 from escaping through conduits 24, 24', 24" and 24''' due to the partial vacuum that would be created by a backwards displacement of disc 18. Neither can the liquid escape through conduits 26 and 26' even if the device be completely inclined, for in such circumstances the free level of the liquid, regardless of the position of the device, cannot reach the inlet to nozzle 25.

In order to employ the device object of the present invention, it is merely necessary to introduce the tip of the valve it is desired to test, inside conduit 10, as illustrated in Figure 2. In this position, axial pressure is exerted, sufficient to overcome spring 28. Flat disc 18, then, together with its rod 19, will thus be displaced inwardly and consequently, the free end of rod 19 pushes ball 27 and frees the outlet of central conduit 20. In these conditions, if the tire valve in question is defective, air will escape therethrough and, however small, will enter through orifice 22 of disc 21 and through openings 23 of disc 18, as indicated by arrows in the drawing. Said air will then follow along channels 20, 11, 24, 24', 24" and 24''', and, on rising to the free surface of liquid 7 will be visible in the form of a continuous series of bubbles, clearly to be seen through the transparent walls of cap 5. At the same time, the air reaching the upper part of receptacle 6, free of the liquid, is expelled through nozzle 25 and conduits 26 and 26', no counter-pressure being thus possible.

The invention as described and illustrated may be clearly understood and further explanations will not be required by those versed in the art.

Inasmuch as this invention has been described and illustrated with particular reference to a preferred embodiment offered as an example only, it is to be understood that changes may be introduced therein without departing from the essential nature of the device, as clearly defined in the following claims.

What we claim is:

1. In a device for testing valves to determine whether said valves are leaking in which air leaking from said valve is passed through a first conduit into a body of liquid below the surface thereof, said body of liquid being confined within a receptacle, and thence through a second conduit communicating between a point within said receptacle above the surface of said liquid and the atmosphere, the improvement which comprises a base including a chamber extending inwardly from a face of said base, said chamber terminating in a cylindrical cavity of reduced diameter in communication with said first conduit, the rear of said cylindrical cavity terminating within said base, an axially bored tube secured in fluid-tight manner within the portion of said cylindrical cavity, communicating with said chamber and terminating short of the point of communication between said cavity and said first conduit, an expansion spring confined within said cavity and means to close the axial bore in said tube positioned between the inner end of said tube and said spring, a stem loosely slidable within said axial bore, the outer end of said stem being secured to a perforated disc centrally positioned within said chamber and slidable therewithin and a resilient disc positioned on the outer face of said perforated disc, said discs having centrally positioned aligned perforations so that insertion of a valve to be tested within said chamber will displace said discs and stem inwardly to move said closure means inwardly against the pressure of said spring to permit air leaking from said valve to pass through said discs, said axial bore, said cavity and said first conduit.

2. A device for testing valves as recited in claim 1 in which the outer end of said tube is provided with an annular flange positioned at the inner end of said chamber and a gasket is interposed between said flange and the inner end of said chamber.

3. A device for testing valves as recited in claim 2 in which said tube is threadedly engaged with the outer portion of said cylindrical cavity.

4. A device for testing valves as recited in claim 1 in which said chamber extends inwardly from a side face of said base and said cylindrical cavity is positioned at right angles to said first conduit.

5. A device for testing valves as recited in claim 1 in which said means to close the axial bore in said tube is a ball biased toward said tube by said spring.

References Cited in the file of this patent
UNITED STATES PATENTS

| | | |
|---|---|---|
| 1,174,577 | Ziegler | Mar. 14, 1916 |
| 1,334,566 | Steinmetz | Mar. 23, 1920 |
| 1,683,095 | Offemaria | Sept. 4, 1928 |
| 1,807,287 | Henkel | May 26, 1931 |
| 2,212,466 | Bradford | Aug. 20, 1940 |
| 2,664,266 | Johnson | Dec. 29, 1953 |